United States Patent
Mongalo Robleto et al.

(10) Patent No.: US 9,579,817 B1
(45) Date of Patent: Feb. 28, 2017

(54) PROCESS FLOOR STAINING WOOD WITH FLUORESCENT DYES AND PIGMENTS

(71) Applicants: Carlos Jose Mongalo Robleto, Miami, FL (US); Carlos Jose Mongalo, Miami, FL (US)

(72) Inventors: Carlos Jose Mongalo Robleto, Miami, FL (US); Carlos Jose Mongalo, Miami, FL (US)

( * ) Notice: Subject to any disclaimer, the term of this patent is extended or adjusted under 35 U.S.C. 154(b) by 0 days.

(21) Appl. No.: 13/694,625

(22) Filed: Dec. 18, 2012

(51) Int. Cl.
*B27K 3/02* (2006.01)
*B27K 5/02* (2006.01)
*C09D 15/00* (2006.01)
*C09K 11/77* (2006.01)

(52) U.S. Cl.
CPC ............... *B27K 5/02* (2013.01); *C09D 15/00* (2013.01); *C09K 11/7734* (2013.01)

(58) Field of Classification Search
None
See application file for complete search history.

(56) References Cited

U.S. PATENT DOCUMENTS

| | | | | |
|---|---|---|---|---|
| 2,723,898 A | * | 11/1955 | Toulmin, Jr. | C09B 29/0003 534/800 |
| 4,127,686 A | * | 11/1978 | Motai | B27K 3/0207 427/297 |

* cited by examiner

*Primary Examiner* — Nathan T Leong
(74) *Attorney, Agent, or Firm* — John H. Faro

(57) ABSTRACT

A process for staining wood, preferably unfinished wood, and/or wood articles from which the finish has been removed, with a stain (oil or water based) containing a plurality of fluorescent dyes and/or pigment, by treating the wood with a bleach to substantially reduce the contrast between the heartwood and sapwood features of the wood grain thereof to the desired degree, and staining the bleached wood with a stain formulation containing a plurality of fluorescent dye or pigment, wherein each fluorescent dye or pigment are absorbed into the wood and produce a uniquely colored stained wood product. The staining process can be repeated, as desired, to attain the stained wood object having a distinctive wood product, in visible light, and a distinctive wood product having a, fluorescent monochromatic appearance, in the absence of visible light. In each instance the color of the stain shall appear in varying intensity depending upon the uptake thereof in the heartwood or the sapwood.

9 Claims, No Drawings

PROCESS FLOOR STAINING WOOD WITH FLUORESCENT DYES AND PIGMENTS

CROSS REFERENCE TO RELATED APPLICATION

This application claims priority to Provision Patent Application filed Sep. 13, 2012, Ser. No. 61/743,891.

BACKGROUND OF THE INVENTION

1. Field of the Invention

This invention relates to a process for preparing pre-finished wood articles of manufacture and to pre-finished articles of manufacture. More specifically, this invention is directed to a process for staining wood, preferably unfinished wood, and/or wood articles from which the finish has been removed, with a stain (oil or water based), to produced a multi-colored, pre-finished wood article of manufacture, wherein the wood grain features of the pre-finished wood article have been highlighted in at least two distinct colors, and/or shades thereof, which have at least two shades of a given color, and are visible in both visible light and in the absence of visible light.

2. Description of the Prior Art

Natural wood can have various shades of a given color, and the intensity thereof varies from the heartwood to the sapwood of any species of timber from which the lumber is cut. Moreover, the grain of a given wood species can appear to have different patterns, depending upon the angle of cut of a section through a piece of timber from which the lumber is cut. Moreover, the appearance of wood for the same species of wood can appear different depending upon the age of tree within a given species. In fact, as wood ages, compounds within wood can oxidize over time producing unexpected reaction (oxidation) products, thereby imparting fluorescent properties to the wood. An early observation of fluorescence in wood was described in 1560 by Bernardino de Sahagún, and in 1565 by Nicolás Monardes in the infusion known as lignum nephriticum (Latin for "kidney wood"). It was derived from the wood of two tree species, *Pterocarpus indicus* and *Eysenhardtia polystachya*. The chemical compound responsible for this fluorescence is matlaline, which is the oxidation product of one of the flavonoids found in this wood, Acuña, A. U.; Amat-Guerri, F.; Morcillo, P. N.; Liras, M.; RodriGuez, B. N. (2009). "Structure and Formation of the Fluorescent Compound of Lignum nephriticum". *Organic Letters* 11 (14): 3020-3023.

The artificial coloring of wood, more specifically, by wood staining, has traditionally involved the preparation of the wood surface, by sanding, the removal of excess colorants from the wood by bleaching, followed thereafter by the application of a water or oil based stain or varnish. This process can typically involve light sanding, and the repeated application of the stain or varnish until the desired color is attained. Often the surface is lightly sanded between applications of successive exposure to a stain; and, in certain instances, can be sanded incident (during) the staining process. After the wood article has received the desired degree of stain, it can be sealed. The sealing process is generally preceded by a light sanding, prior to the application of the sealant. The sealing of the wood surface, (generally with a durable coating such as clear polyurethane based finish), preserves the wood surface from physical damage and reduces oxidation of wood upon exposure to light (marine stains), which can be problematic where the oxidation products, formed within the wood, darken the wood and/or diminish the contrast between stain in the heartwood and stain in the sapwood.

The following patents are representative of the treatment of wood to accomplish a decorative finish, and/or impart a design, through the use of a stencil (U.S. Pat. No. 8,048,517 to Kimball et al., issued Nov. 1, 2011, application of pre-formed designs or strips (U.S. Pat. No. 8,056,295 to Campelle et al., issued Nov. 15, 2011, and various photo assisted creation/transfers of an image pattern to a wood surface (to Lenox et al. issued Dec. 3, 1).

Notwithstanding these prior efforts to provide a finish/pattern to a wood surface, all rely upon traditional processes for applying monochromatic stain for treatment, or alternatively, apply a transfer to such surface, or alternatively, affix a coating to such surface. Moreover, generally all wood stains contain only single colorant, thus, limiting their use and the appearance of the stained product.

Accordingly, there continues to exist a need to enhance the natural appearance of a wood surface without departure from traditional departure from traditional staining techniques.

Objectives of this Invention

It is the object of this invention to remedy the above as well as related deficiencies in the prior art.

More specifically, it is the principle object of this invention to provide a process for the enhancement of the grain pattern of wood products with at least one fluorescent stain, which results in the visualization of the grain pattern in both daylight and in darkness.

It is another object of this invention to provide a process for the enhancement of the grain pattern of wood products with at least one fluorescent stain, by inclusion of more than one fluorescent dye or pigment within a commercially available fluorescent paint and/or stain.

It is yet another object of this invention to provide a process for the enhancement of the grain pattern of wood products with a fluorescent stain, by inclusion of more than one fluorescent dye or pigment within a given paint and/or stain to produce a fluorescent stained wood product having a distinctive features of grain for each of the sapwood and hard wood in both natural light (visible electromagnetic spectrum) and in the absence of visible light.

Additional objects of this invention include natural wood products prepared by the process of this invention, which have enhancement in the visualization of grain pattern in both daylight and in darkness.

SUMMARY OF THE INVENTION

The above and related objects are achieved by providing a process for staining wood, preferably unfinished wood, and/or wood articles from which the finish has been removed, with a stain (oil or water based), by preferably removing all surface imperfections and/or irregularities on the wood surface, and thereafter treating the wood with a bleach to substantially reduce the contrast between the heartwood and sapwood components thereof to the desired degree. Once the wood the contrast between the sapwood and hard wood have been reduced to the desired degree, the wood is contacted with a stain formulation containing more than one fluorescent dye or pigment, wherein each fluorescent dye or pigment are absorbed into the wood and so as to produce a uniquely colored stained wood product. The staining process can be repeated, as desired, to attain the a stained wood object having a wood grained, monochromatic appearance in visible light, and a different wood grained, fluorescent monochromatic appearance in the absence of visible light. In each instance, the color of the stain shall appear in varying intensity depending upon the uptake the stain in the heartwood or the sapwood.

DESCRIPTION OF THE INVENTION INCLUDING PREFERRED EMBODIMENTS

As understood for the purposes of this invention, a "stain" is composed of the same three primary ingredients as paint (pigment, solvent, and binder), but is predominantly pigment (or dye) and solvent with little binder. Much like the dyeing or staining of fabric, a wood stain is designed to add color to the substrate of the sapwood and hardwood feature of the grain of the wood, a while leaving the substrate (background) mostly visible. Transparent varnishes or surface films are applied afterwards. In principle, a "stain" does not provide a surface coating or film. However, because the binders are from the same class of film-forming binders that are used in paints and varnishes, some build-up of film may occur, which can be minimized, if not prevented, by thinning of the stain with a suitable solvent.

The type of stain will either accentuate or obscure the wood grain, and neither is superior to the other. Most commercial stains contain both dye and pigment, and the degree to which they stain the wood is generally dependent on the length of time they are left on the wood. Pigments, regardless of the suspension agent, will not give as much color to very dense woods, but will deeply color woods with large pores (e.g. pine). Dyes are translucent and pigments are opaque.

Bleaching Agents—

In the preferred embodiments of this invention, an ash wood plank is initially bleached to reduce the grain contrast between the sapwood and the hard wood features of the grain, The bleaching process generally involves the use of commercially available products, such as Lite-N-Up Wood Bleach available from Wood Kote Products, Portland, Oreg. USA)—(an aqueous, two part liquid formulation containing hydrogen peroxide and sodium hydroxide). The bleaching process involves the application of the bleach with a brush or other applicator. After the bleach is applied, it is allowed to saturate the unfinished wood, and remains in contact with the wood for an interval of anywhere one to ten minutes. The bleach is removed by neutralization and the bleach wood plank allowed to dry; and, the bleaching process repeated one or more times, until the wood plank has the desired degree of contrast between the sapwood and the hardwood features of the grain has been attained.

Where a natural wood, such as ash, intended for staining is dark, contains extraneous materials (materials not naturally present in the wood), or is uneven is the intensity of the grain features, it may be desirable remove surface imperfections and irregularities, and bleach the wood to lighten the natural color of woods or to even out color differences between heart and sapwood. Bleaches can also be used to remove black water stains, iron stains, and to lighten pigments and stains. The bleaches work through a chemical reaction between the bleach and the color in the wood. These reactions differ from bleach to bleach and, the correct bleach will depend on the wood stock selected and results desired. It is emphasized that the bleaches do not actually remove the color from the wood. They react with the chemical substances to convert them to a substance that is less colored or colorless.

All of the chemicals used to bleach wood can be dangerous if used improperly so care should be taken to protect you from contact with their chemicals. Two (2) part bleaches contain usually contain hydrogen peroxide, which will burn your skin. Keep water nearby and immediately rinse off any of the bleach that touches your skin. These bleaches only work on bare wood so be sure to remove any finishes before attempting to bleach the wood. There are three (3) primary bleaches used by woodworkers today.

Two-Part bleaches are a combination of sodium hydroxide and hydrogen peroxide. These bleaches are used to lighten the natural color of the wood. They are sold in separate containers because they chemically neutralize each other when mixed. When the chemicals are mixed on the wood itself, the reaction removes the color from the wood. They can tend to remove the luster from wood as well, so care should be taken to test the results on a piece of scrap wood. Two part bleaches remove the natural color of the wood and bleach it to an off-white color. This type of bleach is also an excellent choice when you need to even out the color variations between heartwood and sapwood before applying a stain. These two part bleaches are preferred for the processes of this invention.

Chlorine Bleach can be used to remove dye stain from wood in much the same way that it removes color from clothing. Household bleaches such as Chlorox can be used but they tend to be weak and require multiple treatments. The shock treatments used for swimming pools contain a higher concentration of chlorine bleach and can be used for a more-aggressive bleaching treatment. Chlorine bleaches can also be used to remove some food stains such as grape juice.

Oxalic Acid is an excellent choice for removing iron stains and black water rings from old furniture. It is sold in a dry crystal form and is available at most hardware stores. You will often see oxalic acid labeled as "Wood Bleach". It can also be used to remove some inks and pigmented stains. Oxalic acid is also often found in deck cleaners because it works well with old weathered wood.

Neutralizing Bleached after Use—

After the bleaches have completed their jobs they should be neutralized with water and then followed up with a water/baking soda mix. Two-part bleaches can be neutralized with a 1-part vinegar to 2-parts water bath.

Stains—

A wood stain generally consists of a colorant suspended or dissolved in a "vehicle" or solvent. The suspension agent can be water, alcohol, petroleum distillate, or the actual finishing agent (shellac, lacquer, varnish, polyurethane, etc.). In contrast to materials used in the process of this, colored or "stained" finishes, like polyurethane, do not penetrate the pores of the wood to any significant degree, and such color will disappear when the finish itself deteriorates or is removed intentionally.

Two types of colorants can be used in process of this invention—either pigments or dyes. The difference is in the size of the particles. Dyes are microscopic crystals that dissolve in the vehicle and pigments are suspended in the vehicle and are much larger. Dyes will color very fine grained wood, like cherry or maple, which pigments will not. Those fine-grained woods have pores too small for pigments to attach themselves to. Pigments can contain a binder to help attach them to the wood.

The fluorescent dyes or pigments selected for use in this process are preferable soluble and/or dispersible in the fluid vehicle contemplated for use in their application to wood.

The following is a representative list of the fluorescent dyes that can be used in the process of this invention:
Acridine orange,
Acridine yellow,
Alexa Fluor,
7-Aminoactinomycin D,
8-Anilinonaphthalene-1-sulfonic acid,
ATTO dyes,
Auramine-rhodamine stain.
Benzanthrone,
Bimane,
9,10-Bis(phenylethynyl)anthracene,
5,12-Bis(phenylethynyl)naphthacene,
Blacklight paint,
Brainbow,
Calcein,
Carboxyfluorescein,
Carboxyfluorescein diacetate succinimidyl ester,
Carboxyfluorescein succinimidyl ester,
1-Chloro-9,10-bis(phenylethynyl)anthracene,
2-Chloro-9,10-bis(phenylethynyl)anthracene,
2-Chloro-9,10-diphenylanthracene
Coumarin,
DAPI,
Dark quencher,
DiOC6,
DyLight Fluor,
Ethidium bromide
Fluo-3,
Fluo-4
FluoProbes,
Fluorescein,
Fluorescein isothiocyanate,
Fluoro-Jade stain,
Fura-2,
Fura-2-acetoxymethyl ester,
GelGreen,
GelRed,
Green fluorescent protein,
Heptamethine dyes,
Hoechst stain,
Indian yellow,
Indo-1,
Lucifer yellow,
Luciferin,
MCherry,
Merocyanine,
Nile blue,
Nile red,
Optical brightener,
Perylene,
Phloxine
Phycobilin,
Phycoerythrin,
Phycoerythrobilin,
Propidium iodide,
Pyranine,
Rhodamine,
Rhodamine 123,
Rhodamine 6G,
RiboGreen,
RoGFP,
Rubrene,
(E)-Stilbene,
(Z)-Stilbene,
Sulforhodamine 101,
Sulforhodamine B,
SYBR Green I,
Synapto-pHluorin,
Tetraphenyl butadiene,
Tetrasodium tris(bathophenanthroline disulfonate)ruthenium(II),
Texas Red,
Titan yellow,
TSQ,
Umbelliferone,
Yellow fluorescent protein, The stain of this invention can contain one or more non-fluorescent dyes or pigments and one or more fluorescent dyes or pigments. In the representative embodiments of the process of this invention, the stain is formulated from colorants of at least two (2) different colors, and preferably contains at least two fluorescent dyes or pigments, to produce a stain having the color characteristics of each dye. The stain is prepared by mixing of the fluorescent dyes or pigments in a suitable solvent/dispersing agent, such as water, alcohol or petroleum distillate. The relative proportions of dye and solvent/dispersing agent is determined empirically to accomplish the maximum amount of colorant per unit volume of stain. Obviously, the solubility of the dye relative to the solvent/dispersing agent is also a determinant in the amount of dye that can be used in the stain.

In the preferred embodiments of this invention, the stain of this invention can be prepared from a pre-mixed commercially available fluorescent stain, and an additional fluorescent dye or pigment added thereto. As more fully set forth in the following Examples, a commercially available fluorescent stain, such as Wild Fire brand Luminescent Paint, Magenta, is combined with another fluorescent dye. The relative proportions of this representative formulation can contain from about 1 part by weight commercially available fluorescent stain, one part water and one part fluorescent dye (1:1:1). The preferred formulation of this invention can range in relative concentration of from about two parts commercially available fluorescent stain, one part solvent/dispersing agent and two parts additional pigment (2:1:2). Obviously the solvent/dispersing agent should be the same or miscible with the solvent/dispersing agent of the commercially available fluorescent stain.

The stain formulation of this invention is applied to the wood plank flooring in much that same manner as a conventional stain. After a suitable interval, generally anywhere from 2 to 10 minutes, is effective to impart the desired degree of color contract to the sapwood and hard wood features of the wood plank. The excess stain is removed by wiping, preferably before the stain has had an opportunity to dry on the surface of the wood plank.

Defending upon the solvent/dispersing agent, the grain of the wood plank is raised and light sanding may be indicated. The staining step is repeated, as necessary, to achieve the desired effect. Following staining, the surface of the wood plank is sealed, typically, with a polyurethane finish to provide a durable scratch resistant finish. Within the context this invention, the sealing finish is essentially devoid of compounds which absorb ultraviolet (UV) light.

The finished wood plank, when viewed in natural or artificial light, within the visible electromagnetic spectrum, has a traditional grain feature pattern, wherein the sapwood and hard wood features are readily differentiated. Both natural and, in many instances artificial light, contains activating electromagnetic radiation for absorption by the fluorescent dyes. Upon exposure of the stained plank to activating electromagnetic radiation, of sufficient intensity, to energize the fluorescent dyes, the grain pattern glows in the dark, in the absence of activating electromagnetic radiation, to produce a distinctive sapwood and hard wood features of the stained wood plank.

Alternatively, the stained wood plank can also be exposed to a "black light" or ultraviolet light from an artificial light source, for an interval sufficient to activate the fluorescent dyes within the stained wood plank. Subsequent to such exposure, the wood plank is placed in the dark to confirm adequate saturation of the wood plank with stain. The amount of activating electromagnetic radiation exposure of a stained wood plank, to provide adequate energy, and thereby cause the stained wood plank to "glow" in the dark for at least 12 and preferably 24 hours after exposure to such energy.

The Examples provided hereinafter illustrate one of the preferred embodiments of the invention. Parts and percentages appearing in these Examples are by weight unless otherwise indicated.

Example I

An ash wood plank suitable for use as flooring is first obtained from a lumber yard or mill. The plank is typically a finish grade lumber and is relative free from surface impaction and extraneous matter.

The wood plank is initially bleach with a commercially available two (2) part wood bleach, (Lite-N-Up Wood Bleach), by applying the bleach to the wood plank with a roller, and thereafter removing/neutralizing the bleach as recommended by the bleach manufacturer. The wood plank is exposed to the bleach until the wood is saturated, the bleach neutralized, and the wood dried for approximately 30 minutes. The bleaching step is repeated until the contrast between the sapwood and hard wood features of the grain are reduced to the desired degree.

After the wood plank is dried, it is stained with a formulation prepared by addition of water and additional fluorescent dye to a commercially available stain, (Wild Fire Luminescent Paint, Seattle Wash., USA). This formulation is prepared by combining one (1) part Wild Fire stain, one (1) part water and one (1) part PDUG Ultra Green Glow In Dark Powder (Glow Inc. [City, State, Country]. The PDUG fluorescent powder includes titanium dioxide and a number of other metal and metals salts, ($Al_2O_3$, $SrCO3$, $Eu_2O_3$, and $TiO_2$). The foregoing formulation is mixed on a paint shaker to insure uniform distribution of the individual components relative to one another.

The stain is applied to the wood plank with a brush. It can be allowed to dry or the surface of the wood plank wiped to remove the excess stain. The surface of the wood plank is then lightly sanded with 220 grit sand paper, and the staining process repeated, as necessary to attain the desired degree of color saturation of the stain into the wood plank. Once the stained wood plank is dried, it is once again sanded and sealed with a commercially available sealer, Lenmar Ultralaq Precatalyzed Finishes 1c370 Precat W/W Vinyl Sanding Sealer. After the sealer dries, it is lightly sanded again and three coats of clear non-yellowing high gloss moisture curing polyurethane (McGrevor #80), for the final coats applied to the stained wood plank, Example II The process of Example I is repeated except the stain formulation contains the following proportions of commercially available stain, water and fluorescent dyer—2:1:2

What is claimed is:

1. A process for the enhanced visualization of a grain pattern in natural wood products with a stain formulation containing more than one fluorescent dyes or pigments in a fluid vehicle, comprising:
    A. Preparing a natural unfinished wood stock for staining, by sanding said unfinished natural wood stock, to remove surface imperfections, said natural unfinished wood stock having a grain pattern characterized by a natural distribution of sapwood and heartwood;
    B. Reducing the intensity of said grain pattern of said unfinished wood stock, lightening natural color of said sapwood and heartwood of said unfinished wood stock or evening out color differences between heart and sapwood of said natural unfinished wood stock by bleaching said natural unfinished wood stock with an aqueous bleach solution selected from the group consisting of (i) a two part liquid formulation containing hydrogen peroxide and sodium hydroxide, (ii) a chlorine bleach and (iii) oxalic acid,
    C. Neutralizing said aqueous bleach solution in said natural unfinished wood stock by first contacting said natural unfinished wood stock with water, and then with an aqueous solution containing baking soda mix;
    D. Repeating Steps B and C at least one additional time; and
    E Staining said natural unfinished wood stock with a stain formulation, said stain formulation containing more than one fluorescent dyes or pigments in a fluid vehicle, at least one of said dyes or pigments being fluorescent when exposed to activating electromagnetic radiation in the UV and near UV band of the electromagnetic spectrum, and each of said dyes and/or pigment having different color than the other, so as to enhance visualization of said grain pattern in said natural wood products in the absence of activating electromagnetic radiation.

2. The process for the enhanced visualization of grain pattern in natural wood products of claim 1, wherein said stain formulation contains from about 1 part by weight commercially available fluorescent stain, about one part by weight water and about one part fluorescent dye.

3. The process for the enhanced visualization of a grain pattern in natural wood products of claim 2, wherein said natural wood products are lightly sanded between applications of successive exposure to a stain.

4. The process for the enhanced visualization of grain pattern in natural wood products of claim 1, wherein said stain formulation contains of from about two parts by weight commercially available fluorescent stain, about one part by weight solvent/dispersing agent and about two parts by weight additional pigment.

5. The process for the enhanced visualization of grain pattern in natural wood products of claim 4, wherein said natural wood products are sanded during successive exposure to a stain.

6. The process for the enhanced visualization of grain pattern in natural wood products of claim 1, by repeating Step E at least one additional time, until attaining said grain pattern contrast in sapwood and heartwood.

7. The process for the enhanced visualization of grain pattern in natural wood products of claim 1, comprising the additional step of
    F. Applying a transparent, protective surface coating to said surface of said natural wood products following staining of said natural wood products, said transparent, protective surface coating being abrasion resistant and essentially devoid of compounds which absorb activating electromagnetic radiation.

8. The process for the enhanced visualization of grain pattern in natural wood products of claim 1, wherein said transparent, protective surface coating is essentially devoid of compounds which absorb ultraviolet (UV) light.

9. The process for the enhanced visualization of grain pattern in natural wood products of claim 1, by sealing said an abrasion resistant clear coating which is transmissive of ultraviolet light.

* * * * *